(12) United States Patent
Lilly et al.

(10) Patent No.: US 8,713,277 B2
(45) Date of Patent: Apr. 29, 2014

(54) CRITICAL WORD FORWARDING WITH ADAPTIVE PREDICTION

(75) Inventors: Brian P. Lilly, San Francisco, CA (US); Jason M. Kassoff, Jamaica Plain, MA (US); Hao Chen, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 870 days.

(21) Appl. No.: 12/791,387

(22) Filed: Jun. 1, 2010

(65) Prior Publication Data

US 2011/0296110 A1 Dec. 1, 2011

(51) Int. Cl.
*G06F 12/00* (2006.01)

(52) U.S. Cl.
USPC ............. 711/167; 711/138; 711/169; 710/52; 710/58; 712/219

(58) Field of Classification Search
None
See application file for complete search history.

(56) References Cited

U.S. PATENT DOCUMENTS

| | | | |
|---|---|---|---|
| 5,371,880 A | 12/1994 | Bhattacharya | |
| 5,875,462 A | 2/1999 | Bauman et al. | |
| 5,933,610 A | 8/1999 | Chambers et al. | |
| 5,963,502 A * | 10/1999 | Watanabe et al. | 365/233.1 |
| 6,018,792 A | 1/2000 | Jeddeloh et al. | |
| 6,272,601 B1 | 8/2001 | Nunez | |
| 6,393,553 B1 * | 5/2002 | Arimilli et al. | 712/217 |
| 6,519,685 B1 | 2/2003 | Chang | |
| 6,647,464 B2 | 11/2003 | Riedlinger et al. | |
| 6,725,337 B1 | 4/2004 | Tan et al. | |
| 7,111,153 B2 | 9/2006 | Kuttanna et al. | |
| 7,174,403 B2 | 2/2007 | Ganasan | |
| 7,366,940 B2 | 4/2008 | Chiao et al. | |
| 7,702,858 B2 | 4/2010 | Lilly et al. | |
| 7,949,832 B2 | 5/2011 | Lilly et al. | |
| 8,006,042 B2 | 8/2011 | Lauterbach | |
| 2002/0147889 A1 | 10/2002 | Kruckemyer et al. | |
| 2003/0177316 A1 | 9/2003 | Rowlands et al. | |

(Continued)

FOREIGN PATENT DOCUMENTS

| | | |
|---|---|---|
| EP | 1280062 | 1/2003 |
| JP | 2000-029822 | 1/2000 |

OTHER PUBLICATIONS

Mark Hayter, "Zen and the Art of SOC Design," Microprocessor Summit 2006, Session MPS-960 High End Processors, P.A. Semi, Inc., 14 pages.

(Continued)

*Primary Examiner* — Matthew Bradley
*Assistant Examiner* — Alan Otto
(74) *Attorney, Agent, or Firm* — Lawrence J. Merkel; Meyertons, Hood, Kivlin, Kowert & Goetzel, P.C.

(57) ABSTRACT

In an embodiment, a system includes a memory controller, processors and corresponding caches. The system may include sources of uncertainty that prevent the precise scheduling of data forwarding for a load operation that misses in the processor caches. The memory controller may provide an early response that indicates that data should be provided in a subsequent clock cycle. An interface unit between the memory controller and the caches/processors may predict a delay from a currently-received early response to the corresponding data, and may speculatively prepare to forward the data assuming that it will be available as predicted. The interface unit may monitor the delays between the early response and the forwarding of the data, or at least the portion of the delay that may vary. Based on the measured delays, the interface unit may modify the subsequently predicted delays.

19 Claims, 8 Drawing Sheets

(56) References Cited

U.S. PATENT DOCUMENTS

| | | |
|---|---|---|
| 2005/0027945 A1 | 2/2005 | Desai |
| 2005/0172091 A1* | 8/2005 | Rotithor et al. ............... 711/157 |
| 2006/0224829 A1 | 10/2006 | Evrard et al. |
| 2007/0061519 A1 | 3/2007 | Barrett et al. |
| 2007/0083715 A1 | 4/2007 | Vanderpool |
| 2007/0192541 A1 | 8/2007 | Balasubramonian et al. |

OTHER PUBLICATIONS

James B. Keller, "The PWRficient Processor Family," P.A. Semi, Oct. 2005, 31 pages.

Azimi, et al., "Scalability Port: A Coherent Interface for shared Memory Multiprocessors," Proceedings of the 10th Symposium on High Performance Interconnects Hot Interconnects, Sep. 2002, Intel Corporation, Whole Document.

U.S. Appl. No. 12/714,884 filed Mar. 1, 2010.

Office Action from U.S. Appl. No. 13/089,050, dated Jun. 19, 2012, Brian P. Lilly/Apple Inc., 20 pages.

International Search Report and Written Opinion in application No. PCT/US2011/038171 mailed Oct. 19, 2011, 10 pages.

Office Action from U.S. Appl. No. 13/089,050, dated Mar. 12, 2012, Brian P. Lilly/Apple Inc., 17 pages.

\* cited by examiner

CRITICAL WORD FORWARDING WITH ADAPTIVE PREDICTION

BACKGROUND

1. Field of the Invention

This invention is related to the field of processors and, more particularly, to forwarding of the critical word from a cache block fill in processors and related circuitry.

2. Description of the Related Art

Processors typically implement load and store operations to access data in memory. The loads specify reads of memory locations to provide data to the processor, and the stores specify writes to memory locations using data provided from the processor. Depending on the instruction set architecture implemented by the processor, loads and stores may be explicit instructions specified in the instruction set architecture, implicit operations in an instruction that specifies a memory operation, or a combination thereof.

To reduce memory latency for loads and stores, processors typically implement one or more caches that the processors access prior to accessing the main memory system. The caches store recently accessed data in units of cache blocks. Cache blocks may be of varying sizes in various processors, such as 32 bytes, 64 bytes, 128 bytes, etc. The blocks are typically aligned in memory to the natural boundary of their size.

Accordingly, if a load misses in a cache, the cache block containing the load data is read from memory and transferred into the cache. While storing the cache block into the cache will reduce latency for other accesses that hit in the cache, the processor's performance is often heavily impacted by the wait for the load data. Typically, a cache block is transferred using multiple data transmissions on the interconnect from the memory to the processor. To reduce the latency for the load data, the load data is provided in the first transfer of the cache block, and then the remaining data is transferred. The processor and caches can be designed to forward the load data to the target while waiting for the cache block to be provided. In some cases, a memory controller can be designed to provide a response indicating that the data is about to be transferred (e.g. some number of clock cycles prior to the data being transferred) so that the cache/processor can schedule the forwarding of the data. Such memory controllers provide the response a fixed number of clock cycles prior to transferring the data and guarantee that the data will be transferred on the identified clock cycle. Thus, the forwarding is precisely scheduled.

SUMMARY

In an embodiment, a system includes a memory controller and one or more processors and corresponding caches. The system may include sources of uncertainty that prevent the precise scheduling of data forwarding for a load operation that misses in the processor caches. The memory controller may provide an early response that indicates that data should be provided in a subsequent clock cycle. However, the actual clock cycle on which the data is forwarded varies due to the uncertainties in the system. An interface unit between the memory controller and the caches/processors may predict a delay from a currently-received early response to the corresponding data, and may speculatively prepare to forward the data assuming that it will be available as predicted. If the prediction is correct, the data may be forwarded with low latency. If the prediction is incorrect, the data may be forwarded with a higher latency. The interface unit may monitor the delays between the early response and the forwarding of the data, or at least the portion of the delay that may vary. Based on the measured delays, the interface unit may modify the subsequently predicted delays. Thus, the interface unit may adapt the predicted delay to the actual delays being experienced in the system over time, adjusting for the uncertainties.

In an embodiment, the uncertainties may include, for example: uncertain synchronization delays in asynchronous clock domain crossings; uncertainties in pipeline delays within the memory controller, the caches, and/or the processors; and changes in one or more of the clock frequencies due to changes in the operating modes of the system (e.g. entering and exiting low power modes, etc.). The sources of uncertainty may vary from system to system. By adapting the predicted delay to the actual delays being experienced, the forwarding path for the data may more frequently be ready for forwarding when the data is ready for forwarding, reducing the average latency for load data in cache miss situations in some embodiments.

BRIEF DESCRIPTION OF THE DRAWINGS

The following detailed description makes reference to the accompanying drawings, which are now briefly described.

Figure 1:
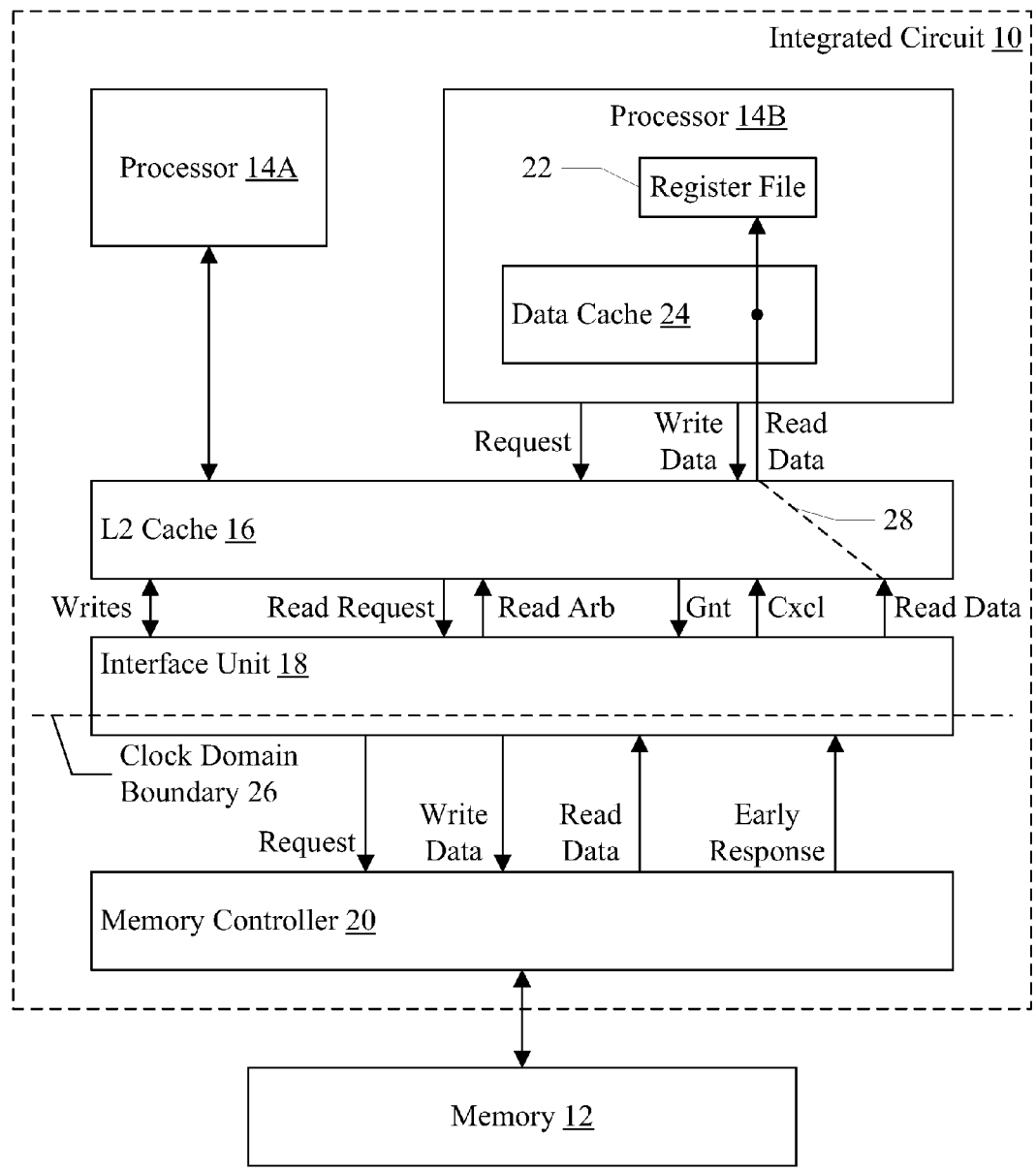
FIG. 1 is a block diagram of one embodiment of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram is shown illustrating one embodiment of an integrated circuit 10 coupled to a memory 12. In the illustrated embodiment, the integrated circuit 10 includes one or more processors such as processors 14A-14B, a level two (L2) cache 16, an interface unit 18, and a memory controller 20. A portion of the processor 14B is illustrated in more detail in FIG. 1 to include a register file 22 and a data cache 24. The processor 14A may be similar. The memory controller 20 is configured to couple to the memory 12, and may be coupled to the interface unit 18 via an interface. As illustrated in FIG. 1, the interface may include a request, write data and read data, and an early response. The interface unit 18 is also coupled to the L2 cache 16 via a write bus labeled "writes" and a read bus that includes a read request and read data. The interface unit 18 is further coupled to the L2 cache 16 via arbitration signalling including read arb (Read Arb), grant (Gnt), and cancel (Cxcl). The processors 14A-14B are coupled to the L2 cache 16 by interfaces that may include request, write data, and read data. A clock domain boundary is also illustrated in FIG. 1 as a dotted line 26.

The processors 14A-14B may be configured to execute load and store operations (more succinctly referred to herein as loads and stores), and may be configured to detect cache misses in their local caches (e.g. the data cache 24 in the processor 14B and a similar cache in the processor 14A). For loads, the processors 14A-14B may be configured to transmit a cache fill request to the L2 cache 16 to read the missing cache block. For store misses, in some embodiments the processors 14A-14B may also be configured to transmit cache fill requests. In other embodiments, the processors 14A-14B may be configured to transmit the store to update the L2 cache 16 and/or the memory 12, but may not transmit a cache fill to read the missing cache block. The processors 14A-14B may be configured to assign an identifier (e.g. a transaction identifier, or TID) to each cache fill request and each other transaction initiated by the processors 14A-14B. The TID may be transmitted with the requests, data, etc. of a transaction to identify the transmission as part of the same transaction.

As illustrated in FIG. 1, the interface between the processor 14B and the L2 cache 16 may include a request bus (e.g. address, command, etc.) and read/write data busses. The read and write data busses may be separate unidirectional buses as shown, or may be combined as a bidirectional data bus. There may also be a response bus for transmitting coherence responses, in some embodiments (not shown in FIG. 1). Other embodiments may use other interfaces, such as packet interfaces, for transmitting requests, responses, and data. The interface to the processor 14A may be similar to the interface to processor 14B.

The processors 14A-14B may be configured to transmit the address of the cache block in the cache fill request. The address may include the least significant bits of the load for which the cache miss was detected, which identifies the word that the load is attempting to access within the cache line. Accordingly, the L2 cache 16 and the memory controller 20 (for L2 cache misses) may be provided with the information identifying which portion of the cache block should be returned initially, to permit forwarding of the load data. A word may be the amount of data that is accessed by the load (e.g. a number of contiguous bytes). In some instruction set architectures, loads may be defined that access a variety of data sizes. The word may be one of the data sizes, and other data sizes may be expressed in terms of the word (e.g. half word, for a load that accesses one half of a word, word, double word for a load that accesses two adjacent words, etc.). The word that was accessed by the load is often referred to as the "critical word" of the cache block being supplied for a cache fill, because the word is the most important word in the cache block to the current performance of the processor. That is, until the critical word is provided, the processor is stalled on the load (and any dependent operations on the load are also stalled). The processor may be configured to speculatively execute other, non-dependent operations in some embodiments, but the critical word is needed to complete the load and operations dependent thereon.

As illustrated in FIG. 1, the read data bus may be coupled to the data cache 24 to write the cache block into the cache, and may also be coupled to the register file 22 to write the critical word into the register file 22. There may be multiplexing (muxing) or other switching to select the critical word form the read data to be written into the register file 22 (not shown in FIG. 1). There may also be buffering to pipeline the data from the read data bus to the data cache 24 and/or the register file 22.

A cache block may be transferred from the memory controller 20 to the interface unit 18 as multiple transmissions on the interface. Each transmission may be referred to herein as a beat of data. For example, a 32 byte cache block may be transmitted as 4 beats of 8 bytes. The size of a beat may vary from embodiment to embodiment. Larger beats may be transmitted on wider data buses, and thus fewer beats may be required to transmit a cache block. On the other hand, wider data buses may be more expensive in terms of the interconnect (wiring) to be provided in the integrated circuit 10 (or pins on the integrated circuit, in other embodiments). Accordingly, the size of the beat may vary from embodiment to embodiment based on design/performance trade offs. The size of the beat may vary at different points as well. For example, the beats transferred between the L2 cache 16 and the interface unit 18, and the beats transferred between the processors 14A-14B and the L2 cache 16, may each vary in size with respect the beats between the interface unit 18 and the memory controller 20 (and may vary in size with respect to each other as well).

The L2 cache 16 may be configured to check for a hit for the cache fill request from the processor 14B, and may be configured return the cache block (with the critical word in the initial beat) to the processor 14B when a cache hit is detected. Cache hits in the L2 cache 16 need not proceed to the interface unit 18. The L2 cache 16 may include queuing or other buffering for requests received from the processors 14A-14B, and may also include queuing/buffering for L2 cache misses to be transmitted to the interface unit 18 (not shown in FIG. 1).

In the illustrated embodiment, the L2 cache 16 may include a write bus interface (shown generically as "writes" in FIG. 1) to the interface unit 18 and a read bus interface to the interface unit 18 including the read request and read data buses shown in FIG. 1. Other embodiments may use a single bus interface for reads and writes (or multiple bus interfaces that each may transmit both reads and writes), or other types of interfaces such as packet interfaces. The interface between the L2 cache 16 and the interface unit 18 may also include arbitration so the interface unit 18 may arbitrate for forwarding data to the processor 14B as mentioned previously and described in more detail below. The interface unit 18 may be configured to arbitrate to forward the critical word and to forward a cache block for a cache fill. The L2 cache 16 may also be serving L2 cache hit data to the processors 14A-14B, and thus the arbitration between the L2 cache hit data and the data transmissions from the interface unit 18 may provide access to the processor busses appropriately between the competing data sources.

In the event of an L2 cache miss, the L2 cache 16 may be configured to transmit the read request to the interface unit 18. The interface unit 18 may be configured to subsequently transmit the request over the interface to the memory controller 20. Additional details of one embodiment of the interface unit 18 are discussed below with regard to FIG. 2. The interface includes a request bus, write data bus, and read data bus in the illustrated embodiment (although a bidirectional read/write data bus may be used in other embodiments, and still other embodiments may implement packet interfaces).

In the illustrated embodiment, the transmission of a request from the interface unit 18 to the memory controller 20 may include crossing a clock domain boundary illustrated by the dotted line 26 in FIG. 1. That is, the circuitry above the line 26 (the processors 14A-14B, the L2 cache 16, and a portion of the interface unit 18) may be in one clock domain and the memory controller 20 and interface thereto may be in a different clock domain. Clocks within a clock domain may be synchronous, and thus the relationship of rising and falling edges of the clock may be deterministic (with allowance for noise and jitter). The circuitry within a clock domain may be clocked at the same frequency and phase (i.e. logically the same clock) or different frequencies but phase locked to each other. On the other hand, clocks in different clock domains may be asynchronous to each other. There may be no deterministic phase relationship between the clocks in different clock domains. The clocks may be at different frequencies, and the frequencies may not have any dependence on each other. Clocks in one domain may change frequencies independent of, and without any signalling or other notification to, the other clock domain. Accordingly, the interface unit 18 may include synchronization circuitry to safely transmit information (requests, data, etc.) from one clock domain to the other. The synchronization circuitry may include any circuitry that may capture information in one clock domain correctly (e.g. meeting timing requirements in the source clock domain), and transmit the information in the other clock domain correctly (e.g. meeting timing requirements in the receiving clock domain). First-in, first-out buffers (FIFOs) are used as an example below, but any synchronization circuitry may be used. The clock domain above the clock domain boundary 26 in FIG. 1 is referred to herein as the processor clock domain, and the clock domain below the clock domain boundary is referred to as the memory clock domain. The corresponding clocks for each domain may be referred to as the processor clock(s) and the memory clock(s), respectively. Similarly, clock cycles in the given clock domain may be referred to as processor clock cycles and memory clock cycles, respectively. A clock cycle may be one period of the corresponding clock.

The memory controller 20 may be configured to read data for the cache block, reading the beat including the critical word prior to other data. The memory controller 20 may be configured to transmit the beat including the critical word prior to the other beats of the cache block. The beat that includes the critical word may also be referred to herein as the critical word, for brevity.

The interface unit 18 may receive the critical word, and may be configured to transmit an arbitration request (Read Arb) for the L2 cache 16 to forward the critical word. The Read Arb request may also identify which processor 14A-14B is being requested. The L2 cache 16 may be configured to arbitrate between the interface unit 18 and data from a cache hit in the L2 cache 16 to determine which data is to be transmitted over the read data bus to the processor 14B (and may similarly arbitrate for the processor 14A). If the L2 cache 16 grants the interface unit 18's request, the L2 cache 16 may be configured to transmit a grant to the interface unit 18. Additionally, the L2 cache 16 may prepare a forwarding path 28 from the read data bus from the interface unit 18 to the read data bus to processor 14B. The path 28 may include muxing or other switching, and may include buffering as well, if desired. The interface unit 18 may be configured to transmit the data. Generally, a forwarding path may include any combination of wiring, buffering, muxing, and/or other circuitry that may transmit data from a source to a destination.

The memory controller 20 may also be configured to return an early response for cache fills, indicating that the critical word is expected to be forwarded in a memory clock cycle that is subsequent to the memory clock cycle in which the early response is transmitted (the "early response clock cycle"). The early response may include the TID of the cache fill, identifying the transaction for which the early response is being provided. The number of memory clock cycles between the subsequent clock cycle and the early response clock cycle may vary from embodiment to embodiment. Generally, the number of memory clock cycles may be selected to provide time for the interface unit 18, the L2 cache 16, and the processors 14A-14B to prepare for forwarding the data. One or more processor clock cycles may be used to prepare the forwarding path. For example, processor clock cycles to transmit the request, arbitrate, return the grant, and actually prepare the path may be needed. In this manner, the delay in forwarding the critical word may be reduced as compared to the case that there is no early response and the arbitration for the L2 is performed when the critical word is received. However, if the data is not ready to be forwarded at the time the grant is received (e.g. because of the various uncertainties below), the interface unit 18 may cancel the data transmission and may await the critical word before arbitrating again for the forwarding path. The memory controller 20 may be configured to return the early response after the read for the cache fill has passed the ordering points in the memory controller 20 and has been scheduled for transmission to the memory 12. The memory controller 20 may include a bypass path to return the read data on the cycle indicated by the early response, in one embodiment. In an embodiment, the physical layer circuitry that interfaces to the memory 12 may be configured to dynamically adjust data return latency to track the operation of the memory 12. In such an embodiment, the physical layer circuitry may be configured to provide feedback to the memory controller logic circuitry indicating the current delay. The memory controller 20 may use the feedback to adjust the delivery of the early return response.

The number of memory clock cycles between the early response and the critical word may also be selected to permit preparation of the data path when the processor clock is running at its lowest supported frequency while the memory is running at its highest supported frequency. At other clock frequency settings, the early response may be provide earlier than it otherwise might need to be provided, but the early response may be useable in any configuration of clock frequencies.

Additionally, the number of memory clock cycles between the early response and the corresponding data may be selected to provide the interface unit 18 some flexibility in arbitrating for the L2 cache 16. The interface unit 18 may vary the arbitration request timing (as compared to the transmission of the early response) to account for various sources of uncertainty in the delay between the early response the corresponding data. The interface unit 18 may adapt the arbitration request timing based on the delays actually experienced in the system, more closely matching the preparation of the forwarding path to the arrival of the critical word and thus may succeed more frequently at forwarding the critical word with shorter delay.

As mentioned above, there are sources of uncertainty in the delay from the early response to the corresponding data. The uncertainties may include uncertainties in the asynchronous clock domain crossings, for example. Depending on the phase relationship of the capture edges of the clocks at the time the data arrives, the delay may be different by one processor clock cycle at various points in time. Additionally, changes in the clock frequency of either clock may be a source of uncertainty until the interface unit 18 has adjusted to the new delay (as measured in processor clock cycles). Pipeline stalls in an of the processors 14A-14B, the L2 cache 16, the interface unit 18, and/or the memory controller 20 may be a source of uncertainty, as may the arbitration delay in the L2 cache 16.

Accordingly, the interface unit 18 may be configured to monitor the delay experienced in previous critical word forwarding operations. The interface unit 18 may be configured to predict the delay that may be experienced for a current critical word forwarding operation, based on the previously experienced delays. That is, the interface unit 18 may adapt the predicted delay based on the recently experienced delays. Accordingly, over time, the interface unit 18 may more accurately perform the critical word forwarding as the interface unit 18 adapts to the uncertainties.

The processors 14A-14B may implement any instruction set architecture. In various embodiments, the processors 14A-14B may implement any microarchitecture, including superscalar or scalar, superpipelined or pipelined, out of order or in order, speculative or non-speculative, etc. Various embodiments may employ microcoding techniques or not, as desired. The data cache 24 may have any capacity and configuration (e.g. set associative, direct mapped, etc.). The number of processors 14A-14B included in a given embodiment may vary, including embodiments with one processor or more than two. The register file 22 may include storage corresponding to any number of registers. For example, the register file 22 may include at least as many registers as the number of general purpose registers specified in the instruction set architecture implemented by the processors 14A-14B. In an embodiment, the register file 22 may include a larger number of registers than the number of general purpose registers to support register renaming, temporary registers for microcode use, etc.

The L2 cache 16 may have any capacity and configuration as desired. The L2 cache 16 may be inclusive of the data cache 24, or may be exclusive or non-inclusive. Other embodiments may not include the L2 cache 16 (and the processors 14A-14B may be coupled directly to the interface unit 18). Still other embodiments may include additional levels of hierarchy.

The memory controller 20 may include circuitry configured to receive memory requests and configured to interface with the memory 12 to complete the requests. In various embodiments, the memory controller 20 may be configured to interface to any type of memory, e.g. static random access memory (SRAM) or various types of dynamic RAM (DRAM) such as synchronous DRAM (SDRAM), double data rate (DDR, DDR2, DDR3, DDR4, etc.) DRAM, low power DDR (LPDDR2, etc.) DRAM, RAMBUS DRAM, etc.

In the illustrated embodiment, the processors 14A-14B, the L2 cache 16, the interface unit 18, and the memory controller 20 are all integrated onto a single semiconductor substrate as the integrated circuit 10. Other embodiments may implement other levels of integration and/or discrete components. The integrated circuit 10 may also integrated peripheral circuitry to form a system on a chip (SOC) implementation. For example, the SOC may further include video and/or audio processing circuitry, on-chip peripherals and/or peripheral interfaces to couple to off-chip peripherals, etc. While one clock domain boundary 26 is illustrated in FIG. 1, other embodiments may include multiple clock domain boundaries.

In an embodiment, the processors 14A-14B may be an example of a processor means; the L2 cache 16 may be an example of a caching means; the interface unit 18 may be an example of an interfacing means; and the memory controller 20 may be an example of a memory controller means. Each means may be a means for providing the operations described above for the corresponding component. In general, and combinatorial and/or sequential logic circuitry that performs the specified operations may be used.

Figure 2:
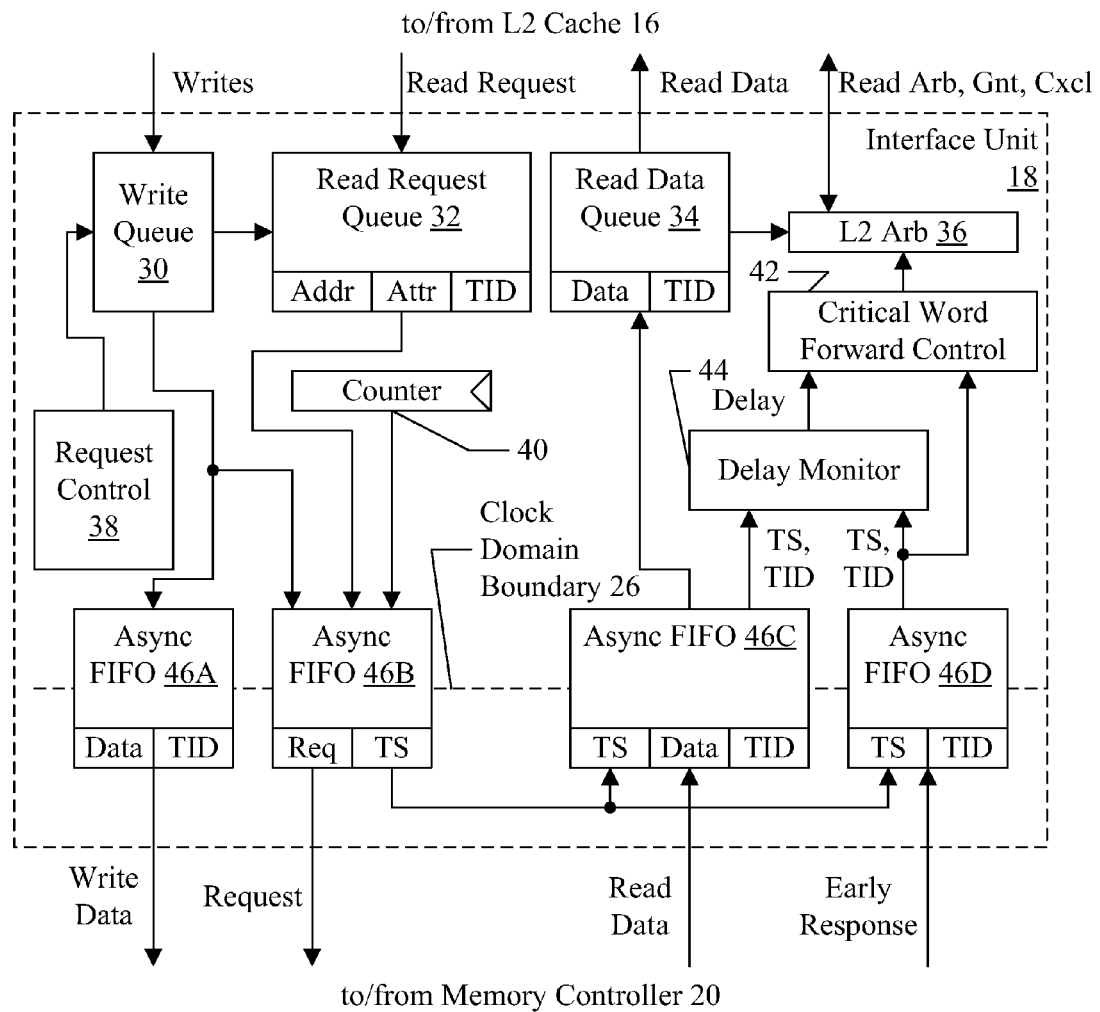
FIG. 2 is a block diagram of one embodiment of an interface unit shown in FIG. 1.

Turning next to FIG. 2, a block diagram of one embodiment of the interface unit 18 is shown. In the illustrated embodiment, the interface unit 18 includes a write queue 30, a read request queue 32, a read data queue 34, an L2 arbitration (Arb) circuit 36, a request control circuit 38, a counter 40, a critical word forward control circuit 42, a delay monitor circuit 44, and asynchronous (async) FIFOs 46A, 46B, 46C, and 46D. The write queue 30 is coupled to receive write operations from the L2 cache 16 and is coupled to the async FIFOs 46A-46B and the request control circuit 38. The read request queue 32 is coupled to receive the read requests from the L2 cache 16 and is coupled to the request control circuit 38 and the async FIFO 46B. The counter 40 is coupled to the async FIFO 46B. The read data queue 34 is coupled to the read data interface to the L2 cache 16, the L2 Arb circuit 36, and the async FIFO 46C. The L2 Arb circuit 36 is coupled to the arbitration interface to the L2 cache 16 (Read Arb, Gnt, and Cxcl) and the critical word forward control circuit 42. The critical word forward control circuit 42 is coupled to the delay monitor circuit 44 and the async FIFO 46D. The delay monitor circuit 44 is coupled to the async FIFOs 46C-46D. The async FIFO 46A is coupled to the write data bus to the memory controller 20. The async FIFO 46B is coupled to the request bus to the memory controller 20 and to the async FIFOs 46C-46D. The async FIFO 46C is coupled to the read data bus from the memory controller 20, and the async FIFO 46D is coupled to receive the early response from the memory controller 20.

The critical word forward control circuit 42 may be coupled to receive the early response indications from the memory controller 20 (via the async FIFO 46D) and may be configured to determine when to speculatively arbitrate for the L2 cache 16 in order to forward the critical word corresponding to the received early responses. More particularly, the critical word forward control circuit 42 may be configured to generate a request to arbitrate for the forwarding path 28 N processor clock cycles after the early response is received, where N is a positive integer (greater than zero). The number of clock cycles "N" may be selected to align the granting of the forwarding path to the clock cycle in which the critical word is available to forward, so that the delay to the critical word may be reduced. More particularly, the size of N may be the delay calculated by the delay monitor circuit 44, or may be derived from the delay. The critical word forward control circuit 42 may signal the L2 Arb circuit 36 with the request for arbitration, and the L2 Arb circuit 36 may transmit the Read Arb in response.

In one embodiment, the critical word forward control circuit 42 may be configured to track multiple early responses concurrently. For example, the critical word forward control circuit 42 may include multiple instances of a state machine or other logic circuitry, each instance assignable to track a separate early response. The critical word forward control circuit 42 may be configured to assign an idle state machine to an early response when the early response is received.

The memory controller 20 may provide the critical word, similar to other read data, to the interface unit 18 and the interface unit 18 may synchronize the data into the processor clock domain using the async FIFO 46C. The data may be provided to the read data queue 34 for storage, and may be available to forward from the read data queue 34 on the read data bus to the L2 cache 16. In some embodiments, the critical word may bypass the read data queue 34 and may be available for forwarding one processor clock cycle earlier.

The delay monitor circuit 44 may be configured to measure the delays between the early responses and the corresponding data as provided from the async FIFOs 46D and 46C respectively to detect the delays actually being experienced (in terms of processor clock cycles). When the measured delays differ from the previously measured delays, the delay monitor circuit 44 may be configured to modify the delay provided to the critical word forward control circuit 42. The delay monitor circuit may adapt the delay, but may not immediately set the delay equal to the currently measured delay, in one embodiment. Instead, the delay monitor circuit 44 may modify the delay to be nearer to the currently measured delay. Over time, if the currently measured delay remains stable, the delay from the delay monitor circuit 44 may approach the currently measured delay. On the other hand, a short-lived change in the currently measured delay may not overly impact the delay provided to the critical word forward control circuit 42. While the delay monitor circuit 44 may measure the delay from the early response to the actual receipt of the data, various embodiments may measure any portion of the delay between the early response and the forwarding of the critical word, or may even measure all of the delay.

Figure 9:
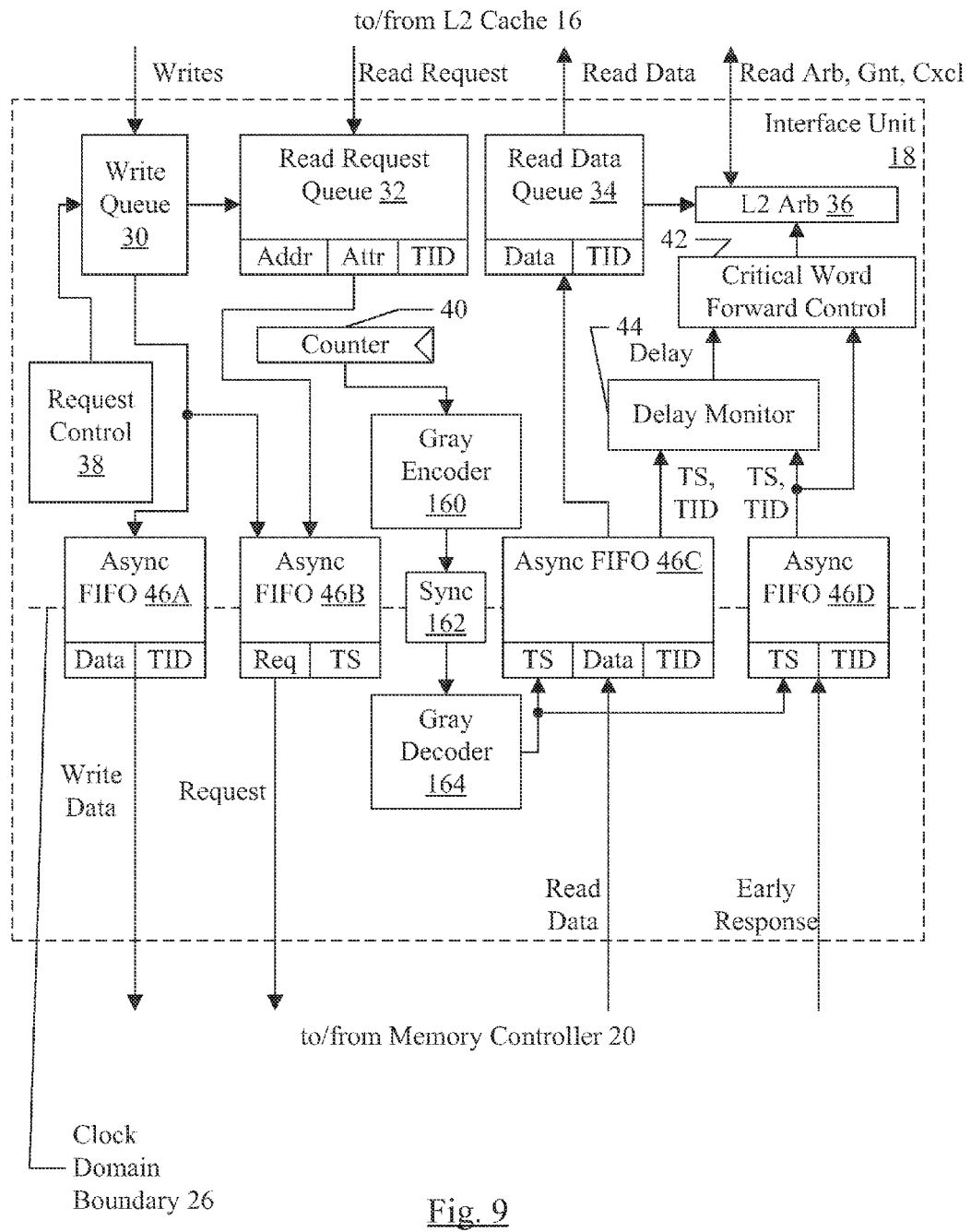
FIG. 9 is a block diagram of another embodiment of an interface unit shown in FIG. 1.

In the illustrated embodiment, the counter 40 may be incremented each clock cycle of the processor clock domain, and may serve as a time stamp for the read data and early responses. The current value of the counter may be written to the async FIFO 46B each clock cycle (along with a read or write request from the read request queue 32 or the write queue 30, if any), and may be provided at the output of the async FIFO 46B as an input to the async FIFOs 46C and 46D. The time stamp may be written to the async FIFOs 46C-46D (along with read data and early response data, respectively, if any). The delay monitor circuit 44 may receive the time stamps and TIDs from the async FIFOs 46C-46D. The delay monitor circuit 44 may take the difference in the time stamps for the same TID as a measurement of the delay. Other embodiments may measure the delay in other ways. Additionally, other embodiments may use other synchronization circuitry to synchronize the timestamp to the memory clock domain (i.e. instead of using the async FIFO 46B). For example, FIG. 9 is a block diagram of another embodiment of the interface unit 18. In the embodiment of FIG. 9, the counter 40 is coupled to a gray encoder 160. The gray encoder 160 may be configured to gray encode the counter value and provided the gray encoded value to a synchronizer 162. The synchronizer 162 may be configured to synchronize the gray encoded value to the memory clock domain. The output of the synchronizer 162 is coupled to a gray decoder 164, which is coupled to provide the time stamp to the async FIFOs 46C-46D. The gray decoder 164 may decode the gray encoded counter value and supply the value as the timestamp to the async FIFOs 46C-46D. Generally, a gray encoding may be designed so that only one bit of the value changes each time the value is incremented. Gray coding may ensure that, even if there is variation in the timing of the synchronization of bits over the clock domain boundary 26, a valid value is sampled in the memory clock domain. The synchronization circuitry of FIG. 9 may be used, e.g., in implementations in which the async FIFO 46B is only written when a new request is to be transmitted to the memory controller 20. That is, the counter value may be continuously synchronized to the memory clock domain while the async FIFO 46B may only synchronize valid requests to the memory clock domain (which may not occur every clock cycle).

The async FIFOs 46A-46D may serve as the synchronization circuits in the present embodiment, synchronizing the transmission of information over the clock domain boundary 26. Generally, an async FIFO may include a memory arranged as multiple entries; a write pointer in the source clock domain that points to one of the entries to which the next information is to be written from the source clock domain; and a read pointer in the receiving clock domain which points to another one of the entries from which the next information is to be read in the receiving clock domain. By ensuring that the read pointer and write pointer do not point to the same entry (and in some cases ensuring that one or more entries are between the read and write pointer), the information in an entry may be ensured to be stable in the entry from the write prior to being read in response to the read pointer.

In the illustrated embodiment, the async FIFOs 46A-46B may be configured to synchronize outgoing write data and read/write requests (respectively) to the memory controller 20. More particularly, read requests may be queued in the read request queue 32 and write requests and data may be queued in the write queue 30 when received from the L2 cache 16. The request control circuit 38 may be configured to monitor the write queue 30 and the read request queue 32, and may be configured to select requests to be transmitted to the memory controller 20. The selected requests may be written to the async FIFO 46B from the queue 30 or 32. An exemplary entry in the read request queue 32 is shown and includes an address field (Addr) storing the address of the request, various attributes in an attribute field (Attr), and a transaction ID field (TID) storing the TID assigned to the request. Write queue entries may be similar, but may also include a data field for the data (or there may be a separate write data queue). The request address, attributes, and TID are illustrated as a request field (Req) in an exemplary entry in the async FIFO 46B, along with the time stamp from the counter 40 as previously discussed. The write data and TID are illustrated in an exemplary entry of the async FIFO 46A as well.

The async FIFOs 46C-46D may be configured to synchronize incoming read data and early responses, respectively, from the memory controller 20. An exemplary entry in the async FIFO 46C illustrates the read data (Data) and TID fields, as well as the time stamp field (TS) capturing the timestamp from the async FIFO 46B. The data from the async FIFO 46C may be written to the read data queue 34 for transmission to the L2 cache 16. An exemplary read data queue entry illustrates a data field (Data) and TID field (TID). The async FIFO 46D illustrates an exemplary entry including the TID of the read for which the early response is provided, as well as the time stamp field (TS).

In an embodiment, the queues 30, 32 and 34 may be examples of a queuing means; the L2 arb control circuit 36 may be an example of an arbitration means; the critical word forward control circuit 42 may be an example of a critical word forwarding means; the delay monitor circuit 44 may be an example of a monitoring means; the counter 40 may be an example of a counting means; the request control circuit 38 may be an example of a request control means; and the async FIFOs 46A-46D may be examples of a synchronization means. Each means may be a means for providing the operations described above for the corresponding component. In general, any combinatorial and/or sequential logic circuitry that performs the specified operations may be used.

It is noted that other embodiments of the interface unit 18 may have different interfaces to the L2 cache 16 and/or the memory controller 20 and may have other differences internally. For example, in an embodiment, the write request and write data interfaces to the L2 cache 16 may be separate, and the arbitration interface to the L2 may be used both for reads (as described previously) and writes (to extract the write data).

In an embodiment, the write request and read request may be transmitted to the memory controller 20 on separate interfaces, and there may be separate async FIFOs for read and write requests. There may also be separate write data and write response interfaces to the memory controller 20, and separate async FIFOs for these interfaces. Any configuration may be used in various embodiments.

Figure 3:
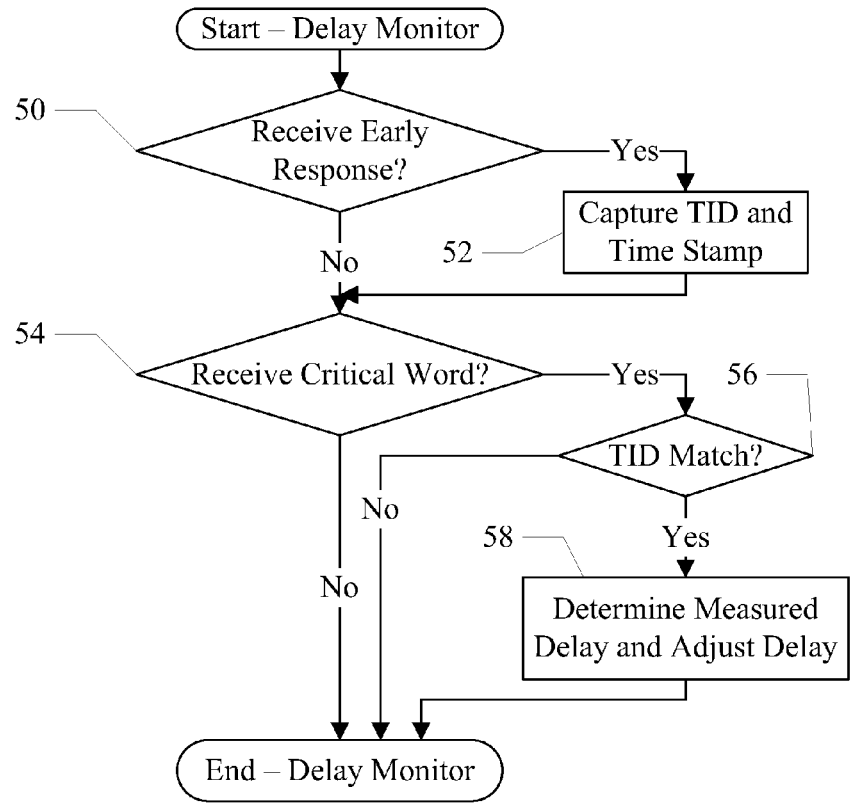
FIG. 3 is a flowchart illustrating operation of one embodiment of a delay monitor shown in FIG. 2.

Turning now to FIG. 3, a flowchart is shown illustrating operation of one embodiment of the delay monitor circuit 44 to measure delays and adjust the delay provided to the critical word forward control circuit 42 based on the measured delays. While the blocks are shown in a particular order for ease of understanding, other orders may be used. Blocks may be performed in parallel in combinatorial logic implemented by the delay monitor circuit 44. Blocks, combinations of blocks, and/or the flowchart as a whole may be pipelined over multiple clock cycles. The delay monitor circuit 44 may be configured to implement the operation shown in FIG. 3.

If the delay monitor circuit 44 receives an early response (decision block 50, "yes" leg), the delay monitor circuit 44 may capture the TID and time stamp from the async FIFO 46D (block 52). The delay monitor circuit 44 may be configured to track more than one early response concurrently. Thus, the delay monitor circuit 44 may include resources to capture up to M TIDs and time stamps, wherein M is a positive integer greater than zero.

If a critical word is received in the async FIFO 46C (decision block 54, "yes" leg), the delay monitor circuit 44 may compare the TID of the critical word to the TIDs captured for the early responses. If the TID matches one of the critical word TIDs (decision block 56, "yes" leg), the delay monitor circuit may determine the measured delay and may adjust the output delay to the critical word forward control circuit 42 if the measured delay and the output delay differ (block 58).

Figure 4:
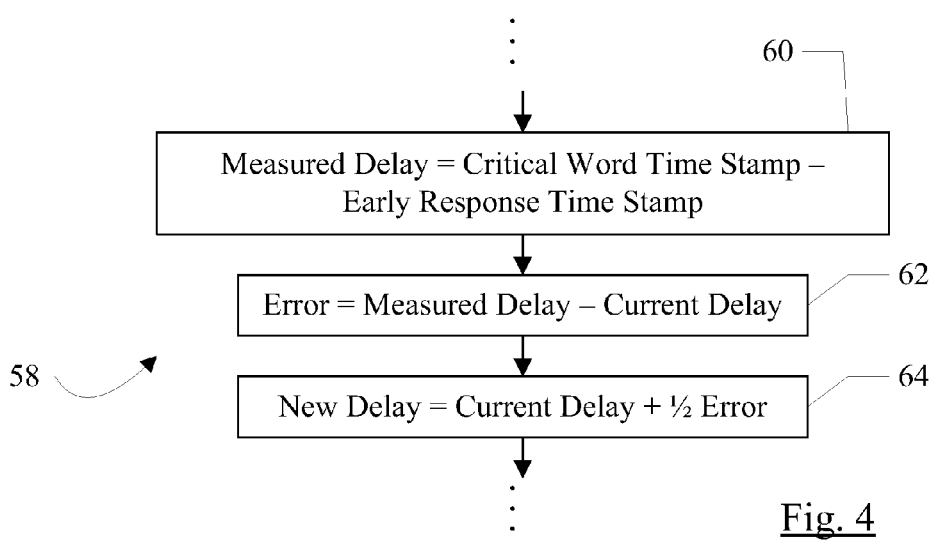
FIG. 4 is a flowchart illustrating one embodiment of a portion of the flowchart shown in FIG. 3, in greater detail.

FIG. 4 is a flowchart illustrating one embodiment of the block 58 shown in FIG. 3. While the blocks are shown in a particular order for ease of understanding, other orders may be used. Blocks may be performed in parallel in combinatorial logic implemented by the delay monitor circuit 44. Blocks, combinations of blocks, and/or the flowchart as a whole may be pipelined over multiple clock cycles. The delay monitor circuit 44 may be configured to implement the operation shown in FIG. 4.

The delay monitor circuit 44 may calculate the measured delay as the difference between the critical word time stamp and the early response time stamp from the matching TID (block 60). The delay monitor circuit 44 may calculate an error as the measured delay from block 60 less the current delay output to the critical word forward control circuit 42 (block 62). Accordingly, the error is positive if the measured delay is greater than the currently output delay, and negative if the measured delay is less than the currently output delay. The delay monitor circuit 44 may add ½ of the error to the currently output delay to generate the new output delay (block 64). Thus, the new delay may be moved to ½ of the way between the currently output delay and the measured delay. Other embodiments may use other adjustment mechanisms, including different fractions of the error.

Figure 5:
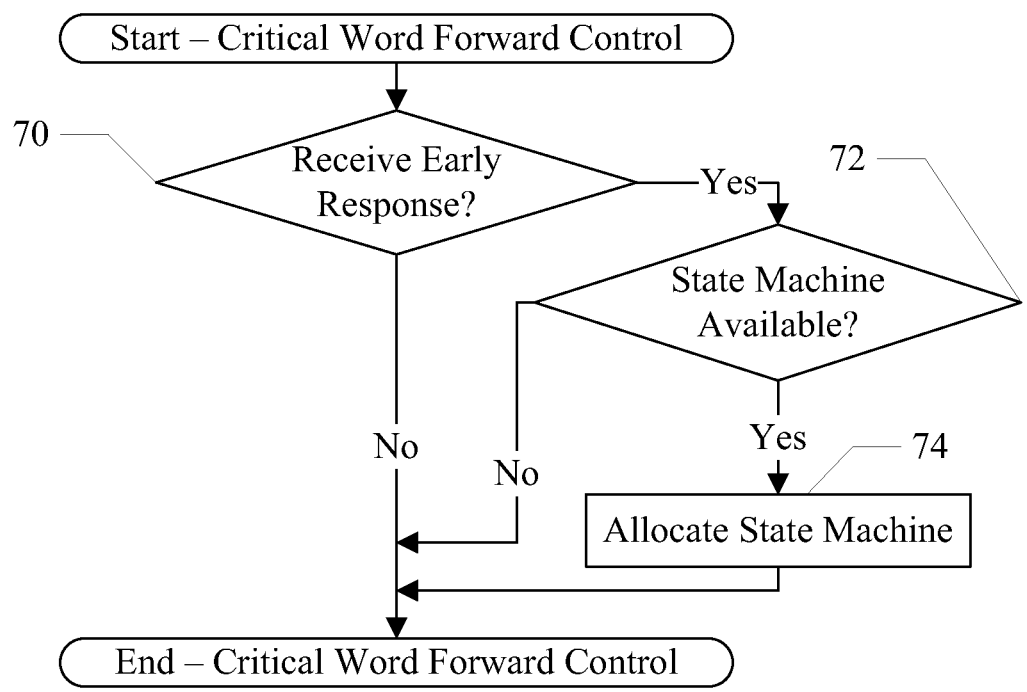
FIG. 5 is a flowchart illustrating operation of one embodiment of a critical word forwarding control circuit in response to an early response indication.

Turning now to FIG. 5, a flowchart is shown illustrating operation of one embodiment of the critical word forward control circuit 42. While the blocks are shown in a particular order for ease of understanding, other orders may be used. Blocks may be performed in parallel in combinatorial logic implemented by the critical word forward control circuit 42. Blocks, combinations of blocks, and/or the flowchart as a whole may be pipelined over multiple clock cycles. The critical word forward control 42 may be configured to implement the operation shown in FIG. 5.

If the critical word forward control circuit 42 receives an early response (decision block 70, "yes" leg), and a state machine is available to speculatively cause the L2 arbitration request according to a predicted delay (decision block 72, "yes" leg), the critical word forward control circuit 42 may allocate a state machine to the transaction (block 74). Any number of state machines may be implemented in various embodiments, and various allocation mechanisms may be used. For example, a first-come, first-served scheme may be used in which the state machines are allocated to the first critical word forwarding operations that arrive. In other embodiments, one or more state machines may be reserved for each processor 14A-14B, so that at least one critical word forward to each processor 14A-14B may be handled. The remaining state machines, if any, may be allocated first-come, first-serve. In some embodiments, the number of state machines may be equal to a maximum number of outstanding cache fill requests, so that each request may be monitored.

Figure 6:
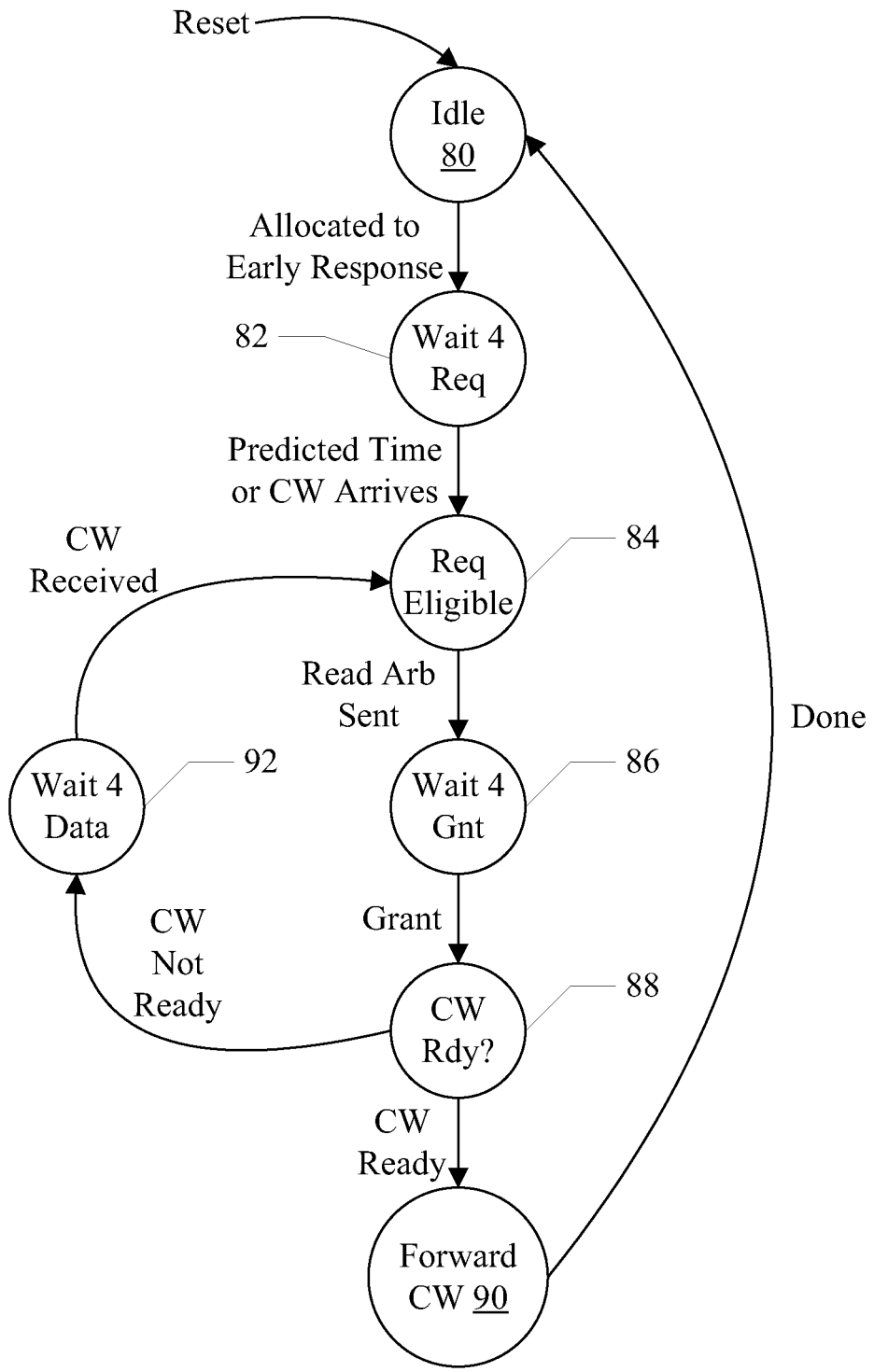
FIG. 6 is a block diagram of one embodiment of a state machine that may be implemented by one embodiment of the critical word forwarding control circuit.

FIG. 6 is a block diagram of one embodiment of a state machine that may be implemented by the critical word forward control circuit 42 to speculatively generate an arbitration request to the L2 cache 16 to forward the critical word based on a predicted delay. As mentioned previously, there may be multiple instances of the state machine to track multiple critical word forwarding opportunities concurrently. The critical word forward control circuit 42 may include circuitry that implements the state machine. In general, the state machine may remain in a given state until a condition is detected that causes the state machine to leave the state (e.g. via the arrows illustrated in FIG. 6).

The state machine may begin in an idle state 80, at reset or when the state machine has completed its operation for a critical word forwarding. When the state machine is allocated in response to an early response (block 74, FIG. 5), the state machine may transition to the wait for request state 82. The state machine may remain in the wait for request state 82 until either the predicted time to make the request expires, or the critical word arrives and is available to forward. If the critical word arrives before the predicted time expires, then the request to arbitrate for the forwarding path may be made non-speculatively. In either case, the state machine may transition to the request eligible state 84.

The predicted time may be derived from the output delay from the delay monitor circuit 44. For example, the predicted time may be less than the delay time by the number of cycles between the request for arbitration and the grant to the interface unit 18 (e.g. 3 clock cycles in this embodiment). Alternatively, additional clock cycles of pipeline delay may be included in the difference between the predicted time and the output delay time. In general, the predicted time may be less than the delay time by the number of clock cycles that may be saved by speculatively requesting the forwarding path for the critical word. In some embodiments, it may be more beneficial to overestimate the delay (so that the data arrives just before the forwarding path is ready) than to underestimate the delay (so that the forwarding path is available before the data). For example, if the forwarding path is available and the critical word is not ready to forward, the interface unit 18 may cancel the forward and re-arbitrate when the data is available, losing the delay saved by speculatively arbitrating.

In the request eligible state 84, the critical word forward control circuit 42 may generate the request to the L2 Arb circuit 36 to arb for the forwarding path speculatively.

When the read arb request is sent, the state machine may transition to the wait for grant state 86, where the state machine remains until the L2 cache 16 grants the arbitration request. The state machine may then transition to the critical word ready state 88. If the critical word is available for forwarding, the state machine may transition to the forward critical word state 90 to forward the critical word. In one embodiment, the state machine may remain in the state 90 until the point at which the read request would have been dequeued in the interface unit 18 if the cache fill had completed, to prevent the dequeue. Subsequently, when the cache block is provided, the data may be written to the L2 cache 16 and the data cache 24 using the same path. After the dequeue has been prevented, the critical word forward is complete and the state machine may transition to the idle state 80. In other embodiments, a set of sequential states may be used after the critical word state 90 to track the progress to the dequeue and suppress the dequeue before returning to the idle state 80.

On the other hand, if the critical word is not ready when the state machine reaches state 88, the state machine may cancel the forward (Cxcl to the L2 cache 16), and may transition to the wait for data state 92. The state machine may transition from the state 92 to the state 84 when the critical word is received, and may forward the critical word non-speculatively. Alternatively, in other embodiments, the state machine may only handle speculative requests for critical word forwarding. The L2 Arb circuit 36 may arbitrate for the critical word when it arrives if the speculation fails. In such an embodiment, state 92 may be eliminated and the state machine may return to the idle state 80 from the state 88 if the critical word is not ready to be forwarded.

In some embodiments, there may be additional transitions as well. For example, in an embodiment in which the state machine also handles non-speculative critical word forwarding, the state machine may transition from the idle state 80 to the request eligible state 84 if the critical word arrives.

Figure 7:
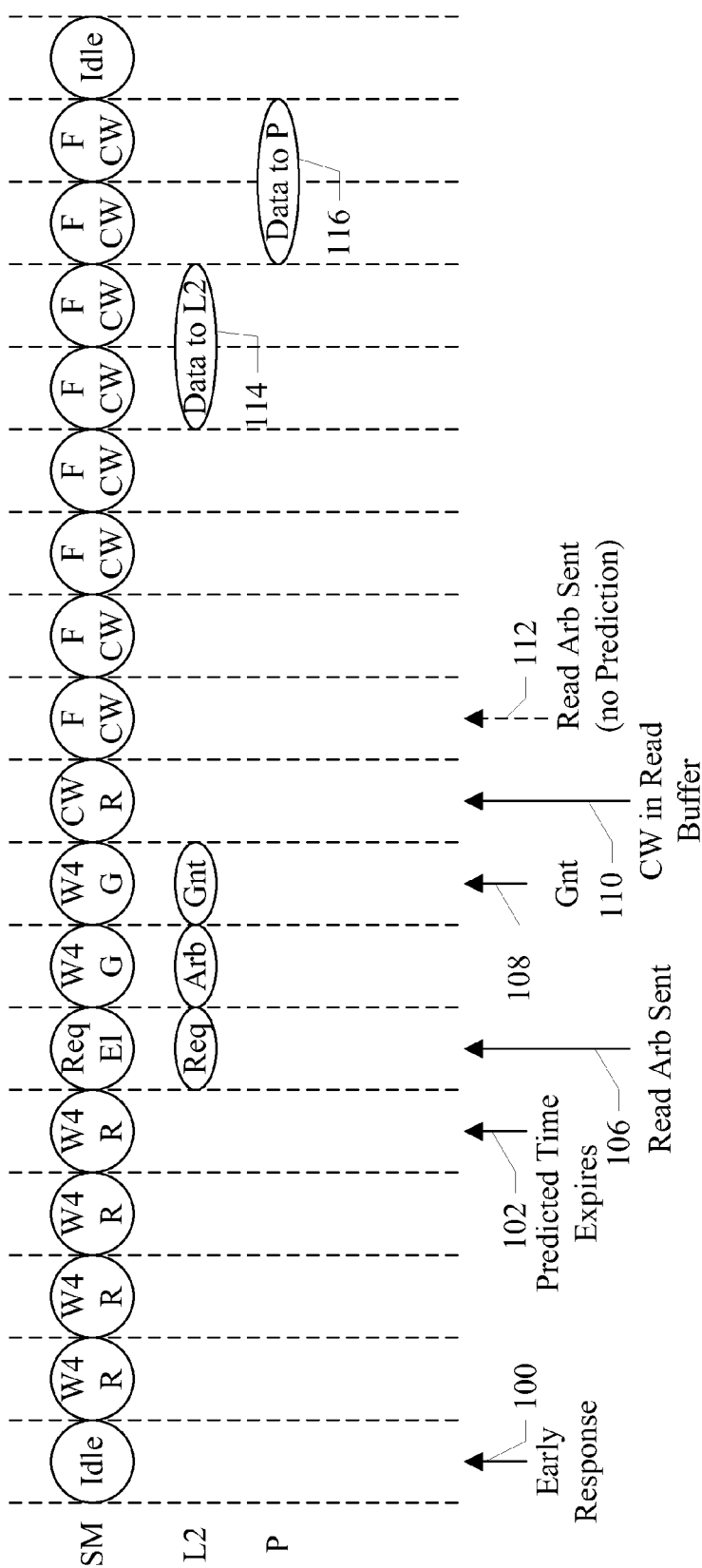
FIG. 7 is a timing diagram illustrating operation of one embodiment of critical word forwarding.

FIG. 7 is a timing diagram illustrating processor clock cycles (delimited by vertical dashed lines) for an example critical word forward. The states of the state machine are shown for each clock cycle across from the label SM. Operation between the interface unit 18 and the L2 cache 16 is illustrated across from the label L2, and the operation at the processor is illustrated across from the label P.

In the first clock cycle, the state machine is in the idle state 80 and the early response is received that causes the state machine to be allocated (arrow 100). The state machine transitions to the wait for request state 82 (W4R in FIG. 7) and begins counting the predicted time for making the speculative request. In the fifth clock cycle, the predicted time expires (arrow 102) and the state machine transitions to the request eligible state 84 (Req E1 in FIG. 7). The read arb request is transmitted in the sixth clock cycle (arrow 106), and the state machine transitions to the wait for grant state 86 (W4G in FIG. 7). The L2 cache arbitrates in the seventh clock cycle, and transmits the grant to the interface unit 18 in the eighth clock cycle (arrow 108). The state machine transitions to the critical word ready state 88, and the critical word is available in the read buffer 34 for forwarding (arrow 110). The critical word is transmitted into the forwarding path, and the state machine transitions to the forward critical word state 90 (F CW in FIG. 7) in the tenth clock cycle. This clock cycle is also the clock cycle in which the non-speculative read arbitration request would normally be sent (dotted arrow 112). Accordingly, the delay saved in this embodiment may be a difference between the clock cycles corresponding to arrows 106 and 112 in this embodiment, or 4 clock cycles in the illustrated example.

Several clock cycles elapse in this embodiment for L2 cache look up hit detection, which is not performed for critical word forwarding. However, in this example, the same pipeline is used to forward the critical word and thus the data flows through these pipeline stages. The data is forwarded through the L2 (data to L2, reference numeral 114) and then to the processor (data to P, reference numeral 116). The state machine may then return to the idle state.

Figure 8:
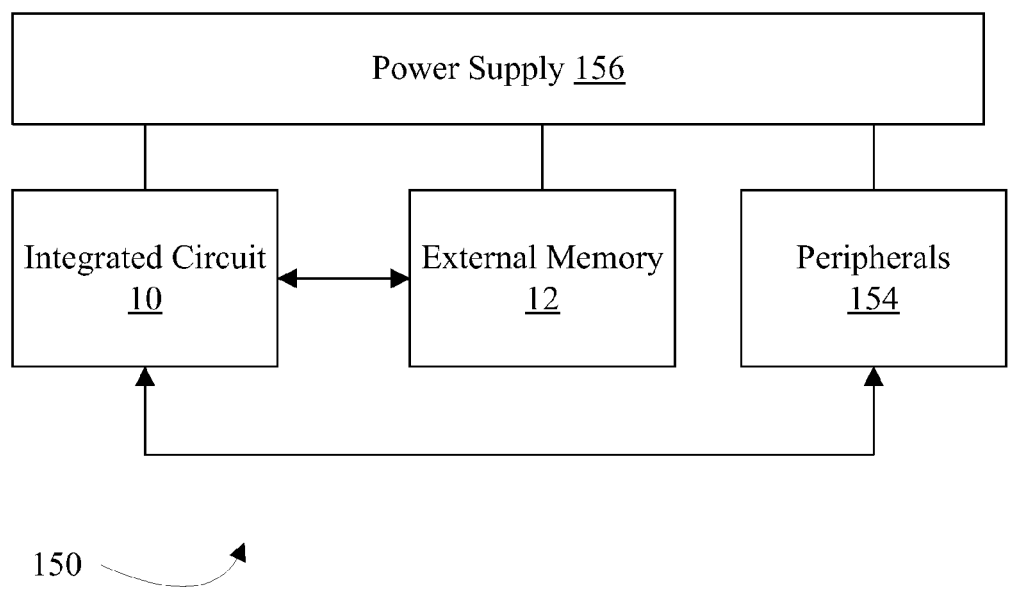
FIG. 8 is a block diagram of one embodiment of a system.

Turning next to FIG. 8, a block diagram of one embodiment of a system 150 is shown. In the illustrated embodiment, the system 150 includes at least one instance of the integrated circuit 10 coupled to the external memory 12. The integrated circuit 10 is coupled to one or more peripherals 154 and the external memory 12. A power supply 156 is also provided which supplies the supply voltages to the integrated circuit 152 as well as one or more supply voltages to the memory 12 and/or the peripherals 154. In some embodiments, more than one instance of the integrated circuit 10 may be included (and more than one external memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:
1. An interface unit coupled to receive an indication from a memory controller that data corresponding to a read request is expected to be transmitted by the memory controller to the interface unit in a future clock cycle, wherein the interface unit comprises:

a control circuit configured to generate a request to forward the data to a source of the read request responsive to the indication, wherein the control circuit is configured to generate the request N clock cycles after receiving the indication from the memory controller to permit forwarding of the data when the data is subsequently received in the future clock cycle, wherein N is a positive integer; and a delay monitor circuit configured to monitor delay for at least a portion of the time from the indication to the forwarding of the corresponding data, wherein the delay monitor circuit is configured to adaptively modify N for subsequent data forwardings for subsequent read requests to account for uncertainties in the delay responsive to detecting that the delay differs from N during the monitoring, wherein the uncertainties cause the delay to be different for different subsequent read requests directed to the same memory controller, and wherein the delay monitor circuit and the control circuit are configured to operate according to a first clock, and wherein N is measured in clock cycles of the first clock, and wherein the memory controller is configured to operate according to a second clock that is asynchronous to the first clock, wherein a cause of the uncertainty in the delay includes a synchronization from a second clock domain associated with the second clock to a first clock domain associated with the first clock.

2. The interface unit as recited in claim 1 wherein another cause of the uncertainty of delay is a change in clock frequency of at least one of the first clock and the second clock.

3. The interface unit as recited in claim 1 wherein another cause of the uncertainty of delay is a stall in a pipeline to the source of the read request.

4. The interface unit as recited in claim 1 further comprising:

one or more first-in, first-out (FIFO) buffers configured to perform the synchronization; and a counter configured to increment according to the first clock;

wherein the interface unit is configured to synchronize a value of the counter to the second clock domain and through the FIFO buffers from the second clock domain to the first clock domain, wherein a difference in the value of the counter received from the FIFO buffers concurrent with the indication and the value received from the FIFO buffers concurrent with the data is a measurement of the delay.

5. A method comprising:

receiving, in an interface unit, an indication from a memory controller that an initial word of a cache block fill is predicted to be provided from the memory controller to the interface unit;

the interface unit predicting a subsequent clock cycle at which a request to forward the initial word to a processor that initiated the cache block fill is to be generated in order to transmit the initial word in the case that the initial word is provided as expected according to the prediction from the memory controller, wherein the interface unit predicting the subsequent clock cycle is in response to the indication from the memory controller, and wherein the subsequent clock cycle is predicted because uncertainties in the delay in delivering the initial word cause the delay to vary for different cache block fills from the same memory controller, during use, and wherein the interface unit operates according to a first clock, and wherein the memory controller operates according to a second clock that is asynchronous to the first clock, wherein a cause of the uncertainty in the delay includes a synchronization from a second clock domain associated with the second clock to a first clock domain associated with the first clock;

generating the request in the subsequent clock cycle in response to the interface unit predicting the subsequent clock cycle;

receiving a grant in response to the request;

detecting that the initial word is provided as predicted by the memory controller; and forwarding the initial word in response to the grant.

6. The method as recited in claim 5 further comprising:

receiving, in the interface unit, a second indication from the memory controller that a second initial word of a second cache block fill is predicted to be provided;

the interface unit predicting a second subsequent clock cycle at which a second request to forward the second initial word to the processor that initiated the second cache block fill is to be generated in order to transmit the initial word in the case that the second initial word is provided as predicted by the memory controller, wherein the interface unit predicting the second subsequent clock cycle is in response to the second indication from the memory controller;

generating the second request in the second subsequent clock cycle in response to the interface unit predicting the second subsequent clock cycle;

receiving a second grant in response to the second request;

detecting that the second initial word is not provided as predicted; and transmitting a cancel in response to the second grant.

7. The method as recited in claim 6 further comprising:

subsequently receiving the second initial word;

generating a third request in response to receiving the second initial word;

receiving a third grant in response to the third request; and forwarding the second initial word in response to the receiving.

8. The method as recited in claim 5 further comprising:

receiving, in the interface unit, a second indication from the memory controller that a second initial word of a second cache block fill is predicted to be provided;

the interface unit predicting a second subsequent clock cycle at which a second request to forward the second initial word to the processor that initiated the second cache block fill is to be generated in order to transmit the initial word in the case that the second initial word is provided as predicted by the memory controller, wherein the interface unit predicting the second subsequent clock cycle is in response to the second indication from the memory controller;

receiving the second initial word earlier than predicted;

generating the second request responsive to receiving the second initial word;

receiving a second grant in response to the second request;

forwarding the second initial word to the processor in response to the grant.

9. The method as recited in claim 1 further comprising:

monitoring delays between respective indications from the memory controller and corresponding initial words; and modifying the predicting of the subsequent clock cycle according to the delays.

10. An integrated circuit comprising:
one or more processors, each processor comprising a data cache and configured to generate read operations in response to cache misses in the data cache;
a second level cache coupled to the processors and configured to transmit one or more of the read operations to an interface unit, wherein the one or more read operations miss in the second level cache; and
the interface unit coupled to the second level cache and to a memory controller, wherein the interface unit is configured to transmit the one or more read operations to the memory controller, and wherein the interface unit is coupled to receive an early response from the memory controller, and wherein the interface unit is configured to predict a subsequent clock cycle at which a critical word of a cache block will be available for forwarding for a given read operation of the one or more read operations in response to the early response corresponding to the given read operation, and wherein the interface unit is configured to monitor delays between early responses and corresponding critical words to modify the prediction for subsequent read operations based on the detected delays, and wherein the subsequent clock cycle is predicted because uncertainties in the delay cause the delay to vary for different read operations directed to the same memory controller, and wherein the interface unit is configured to operate according to a first clock, and wherein N is measured in clock cycles of the first clock, and wherein the memory controller is configured to operate according to a second clock that is asynchronous to the first clock, wherein a cause of the uncertainty in the delay includes a synchronization from a second clock domain associated with the second clock to a first clock domain associated with the first clock.

11. The integrated circuit as recited in claim 10 wherein the interface unit is configured to predict a first number of clock cycles of delay, and wherein the interface unit is configured to determine a difference between the first number and a second number of clock cycles detected by monitoring the delay, and wherein the interface unit is configured modify the first number by one half of the difference to generate subsequent predictions.

12. The integrated circuit as recited in claim 10 wherein the interface unit is configured to speculatively arbitrate for a forwarding path from the second level cache responsive to the prediction.

13. The integrated circuit as recited in claim 12 wherein the interface unit is configured to forward the critical word responsive to receiving a grant from the second level cache and detecting that the critical word is available for forwarding.

14. The integrated circuit as recited in claim 12 wherein the interface unit is configured to detect that the critical word is not available for forwarding, and to inform the second level cache that the forwarding is cancelled.

15. The integrated circuit as recited in claim 12 wherein the second level cache is configured to prepare the forwarding path and transmit a grant to the interface unit.

16. The integrated circuit as recited in claim 12 wherein the forwarding path is to a register file in the processor that initiated the given operation, wherein the data cache in the processor and the second level cache in the processor are not written in the forwarding operation.

17. An interface unit comprising:
a delay monitor circuit configured to monitor delays between responses from a memory controller indicative of potential subsequent transmissions of critical words from the memory controller to the interface unit and the actual receipt of the critical words, wherein the delay monitor circuit is configured to generate a predicted delay responsive to the monitoring, and wherein the delay is predicted because uncertainties in the delay cause the delay to vary for different critical words from the same memory controller, and wherein the interface unit is configured to operate according to a first clock, and wherein the memory controller is configured to operate according to a second clock that is asynchronous to the first clock, wherein a cause of the uncertainty in the delay includes a synchronization from a second clock domain associated with the second clock to a first clock domain associated with the first clock; and
a critical word forwarding circuit coupled to receive the predicted delay and configured to speculatively request a forwarding path to a processor to forward the critical words responsive to the predicted delay and the responses from the memory controller.

18. The interface unit as recited in claim 17 wherein the delay monitor circuit is configured to detect variations in the delays and to modify the predicted delay to match recently detected delays.

19. The interface unit as recited in claim 17 wherein the interface unit is in a first clock domain that is separate from a second clock domain of the memory controller, and wherein the interface unit is configured to synchronize the responses from the memory controller and the critical words from the second clock domain to the first clock domain, wherein variations in the delay are introduced by variations in the delay of the synchronizations, in at least some embodiments.

* * * * *